Figure 1:
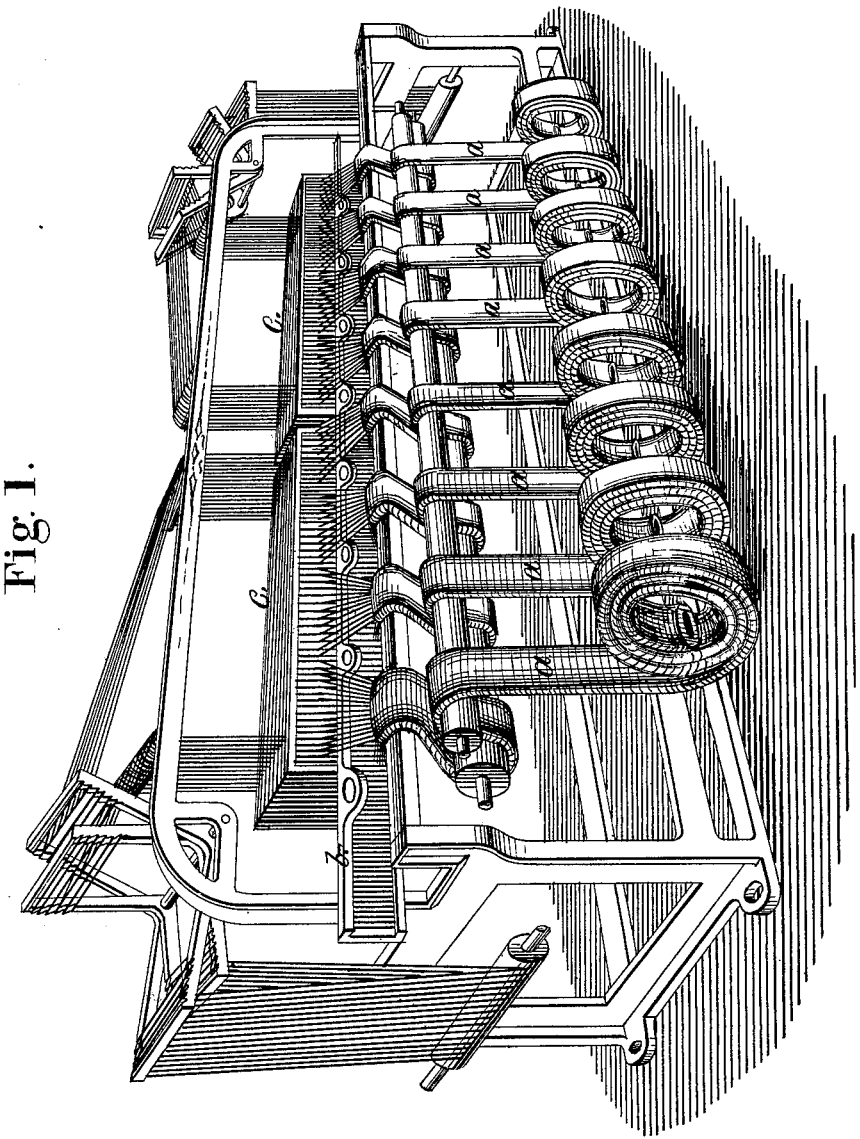

2 Sheets—Sheet 1.

S. W. BAKER.
Tubular Woven Fabric.

No. 200,965. Patented March 5, 1878.

WITNESSES.

INVENTOR

Seth W Baker
by Joseph A Miller
Attorney

2 Sheets—Sheet 2.

S. W. BAKER.
Tubular Woven Fabric.

No. 200,965.     Patented March 5, 1878.

WITNESSES.
L. P. Langworthy
Chas. Larkin

INVENTOR.
Seth W. Baker
by Joseph A. Miller
attorney

N. PETERS, PHOTO-LITHOGRAPHER, WASHINGTON, D.C.

UNITED STATES PATENT OFFICE.

SETH W. BAKER, OF PROVIDENCE, RHODE ISLAND, ASSIGNOR TO S. W. BAKER MANUFACTURING COMPANY, OF SAME PLACE.

IMPROVEMENT IN TUBULAR WOVEN FABRICS.

Specification forming part of Letters Patent No. 200,965, dated March 5, 1878; application filed June 16, 1877.

*To all whom it may concern:*

Be it known that I, SETH W. BAKER, of the city and county of Providence, and State of Rhode Island, have invented new and useful Improvements in Tubular Woven Fabrics; and I hereby declare that the following is a full, clear, and exact description thereof, reference being had to the accompanying drawings, forming part of this specification.

My invention relates to improvements in tubular woven fabric, the object being to provide a tubular woven fabric made up of three or more plies, wherein the outer and inner surfaces of the fabric shall be closely woven, and the several plies interwoven by the weft arranged in helical form, and serving to bind a portion of the warp-threads of the outer and inner plies with the warp of the central ply or plies, to constitute a strong and elastic fabric.

My invention consists, first, in a tubular woven fabric made up of three or more plies, wherein, in case of a three-ply fabric, one-half of the warps of the inner and outer plies passes alternately over and under the weft in nearly a straight line, while the remaining portion of the warps of said outer and inner plies passes diagonally around the central lines of weft, and is thus used to form an intermediate ply; and in the case of a four-ply fabric, one-half of the warps of the inner and outer plies is arranged as before, while the remaining portion of the warps of said outer and inner plies passes respectively around that line of weft which is adjacent to said outer and inner ply, and is thus used to form intermediate plies, which are in turn locked together by a separate series of warps, which pass diagonally from one to the other of said intermediate plies. In the case of a fabric containing six or a greater number of plies, a similar manipulation of warps and weft is adopted; but additional series of intermediate warps, which do not appear upon the surface of the fabric, are required. A tubular fabric woven in the manner herein set forth is formed without seam or joint, the inner and outer surfaces being closely woven, while the several plies of which the fabric is composed are securely interwoven with each other.

My invention further consists in a tubular woven fabric made up of three or more plies, wherein the warp of the outer ply is composed of thick strong thread and the warp of the inner ply of fine thread, one-half of the warp of the outer ply and one-half of the warp of the inner ply, together with a continuous weft, constituting the main portion of the outer and inner surfaces of the fabric, while the remaining portions of the warp of the inner and outer plies are laid diagonally, and interwoven with the intermediate ply or plies by the continuous weft, which latter is laid helically between all the plies, whereby the outer surface of the fabric is closely woven, of strong thread, and thereby adapted to sustain hard usage and great wear, while the inner surface of the fabric is also closely woven of fine thread, thus rendering it specially adapted for hose for hydraulic purposes, as the friction produced by the water passing through the same is obviously less than where the interior of the fabric is of rough and open structure. Again, the inner surface of the fabric being smooth, a coating of rubber, when formed thereon, will present a smooth unbroken surface for the passage of water, and the fabric, owing to its compact structure, is specially adapted to retain the rubber coating in close contact therewith. The helical weft extending through the several plies operates to distribute the strain on all the plies of which the fabric may be composed.

My invention further consists in a tubular woven fabric made up of three or more plies, wherein the weft or filling is laid continuously and successively through the several plies of which the fabric is composed, said weft passing from the outer ply to the inner ply in helical form, and then passing outwardly to the outer ply, and thereby forming a continuous helical filling extending throughout the entire length of the fabric.

My invention further consists in a tubular woven fabric composed of three or more plies, wherein one-half of the warp of the outer ply and one-half of the warp of the inner ply are laid alternately over and under the continuous weft, while the remaining portions of the warp of said plies are interwoven with the intermediate ply or plies by said weft, which latter is laid helically between the successive plies of the fabric, the entire warp and weft of said fabric being woven together in such a manner that the fabric in its normal condition is of oval or flattened form in cross-section. This latter feature of my invention—namely, the peculiar shape of the hose—prevents the straining of the same when not in use; and as the hose is wound on a reel for the greater portion of the time, it will not thereby become deteriorated, as is the case with tubular woven fabric of ordinary form and construction.

Figure 2:
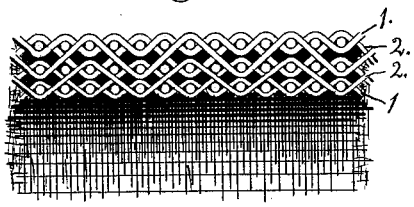
Figure 3:
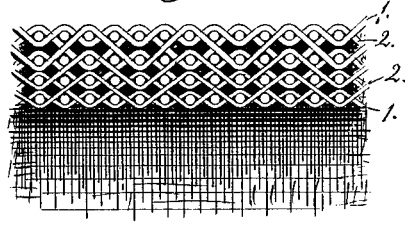
Figure 4:
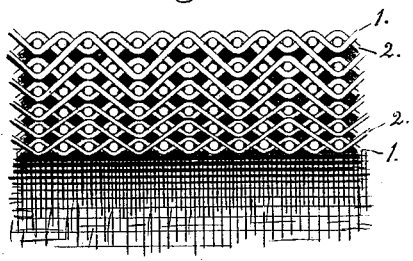
Figure 5:
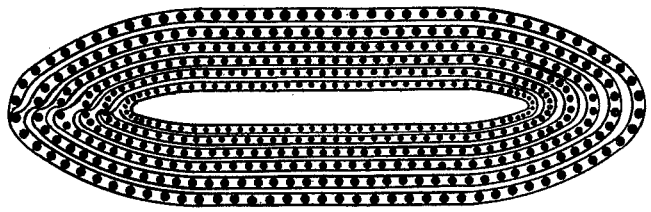
Figure 6:
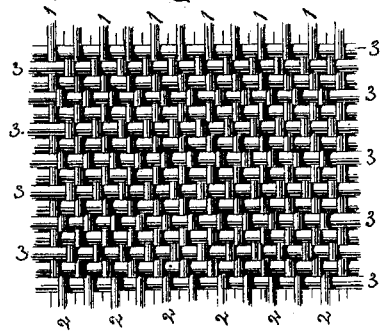

In the accompanying drawings, Figure 1 represents the form of loom on which my improved fabric is woven, the one shown in the drawings being adapted to weave eight separate fabrics at the same time, and hence it is provided with eight positive-motion shuttles and eight groups of warps, four harnesses being required for each ply of the fabric. Fig. 2 is a longitudinal section of a three-ply fabric embodying my improvement, showing the lay of the several warp-threads, and also the location of the weft or filling. Fig. 3 is a longitudinal section of a four-ply tubular woven fabric embodying my invention; and Fig. 4 shows a similar view of a six-ply fabric. Fig. 5 is a cross-section of a six-ply fabric, illustrating the arrangement of the warp-threads, the outer ones being coarse to withstand the wear to which the hose is subjected, while the inner ones are composed of fine thread to form a smooth and even surface on the interior of the hose or fabric. Fig. 6 is a plan view of a portion of the surface of the fabric, showing one-half of the warp-threads (designated by the figures 1) as passing alternately over and under the weft-threads 3, while the remaining portions of the warp-threads 2 are shown as passing over one weft-thread, and then under the three adjacent threads, and so on throughout the entire fabric. Both the outer and inner surfaces of the tubular fabric are woven in the manner illustrated in this figure.

In Fig. 1, the letters a represent the separate lengths of tubular fabric as being woven simultaneously on a flat loom. The shuttle-cam b is provided with as many shuttles as there are lengths of fabric to be woven. Harnesses c are designed to be of such a number and so arranged that four harnesses shall be used to raise and lower the warp of each complete or tubular ply of the fabric.

When it is desired to weave a tubular fabric consisting of four plies, the warp-threads entering into the structure of such a fabric are subdivided into eight different groups, which are equally divided among sixteen harnesses—that is to say, each group of the warp-threads is subdivided in two parts, each of which latter is governed by a separate harness. The eight different groups of warp-threads are arranged one-half above and one-half below an imaginary horizontal line, so that the warp-threads will form four lines around a central slit, with the edges where the upper and lower groups or sets of warp join each other more closely packed; or, if desired, the threads around these points may be individually stronger, so as to give more strength and durability to these edges.

In order to clearly describe the method of inserting the weft or filling, it may therefore be considered that the eight groups of warp-threads above mentioned require two groups of harnesses for each fabric. In the present instance, when a four-ply fabric is being described, each group of harnesses will be composed of eight different harnesses. Now, since as heretofore stated, there are eight different groups of warp-threads, four arranged above and four below an imaginary line, and since for each separate group of warp-threads there are two separate harnesses—or, in other words, there are two harnesses for the warp entering into each ply of the upper and two for the warp entering into each ply of the lower part of the fabric—it follows that for this fabric there must be sixteen harnesses. These warps are so arranged that the spool with the weft, when traveling in one direction, can pass between the shed of the warp of one ply of the upper half of the fabric around and return through the shed formed by the warp of the same ply of the lower half of the fabric. A shed is then formed with the warps of the next adjoining ply, and the weft is passed into said ply, and so on from one ply to another until the weft has been passed through the inner ply, when it is then carried back again through the successive plies, thus laying all the weft of a single tubular fabric by means of a single shuttle, and thereby producing a strong, durable, and pliable fabric, well adapted for use as a hose.

This fabric, as heretofore set forth, is woven in a flat loom, and two or more lengths can be woven at the same time on a single loom.

In Fig. 2, showing a horizontal section of a portion of a three-ply fabric, one-half of the warp of the outer ply and one-half of the warp of the inner ply are each designated by the figure 1.

It will be observed that the warp above mentioned passes under and over the weft or filling in nearly a straight line, and forms, with said filling, nearly the entire outer and inner surface of the fabric. The remaining half of the warp of the outer ply and the inner ply (designated by the figure 2) passes over the weft of the outer and inner plies, and then extends inwardly beneath and beyond the adjoining lines of weft of said outer and inner plies, and over and under the central line of weft, and from thence, in a diagonal direction, outwardly to the outer and inner surfaces of the fabric, and over the line of weft or filling therein, thus effectually tying or binding the plies together.

The warp of the inner and outer plies are laid in the same manner, whether the fabric be composed of three, four, or six plies, as will be observed by referring to Figs. 2, 3, 4, and 5, wherein that part of the warp which forms the main portion of the outer and inner surfaces of the fabric is designated by the figure 1, while the remaining portion of the warp of said outer and inner plies is marked 2, the latter serving to bind the adjacent plies to the inner and outer plies, respectively.

It will be observed that the inner surface of the fabric is smooth and even, and when a coating of rubber is attached thereto it is firmly held in place, and is not liable to become cracked or torn.

This fabric is preferably woven on a flat loom, and the warps arranged in such a manner that the edges of the fabric shall be strengthened, which may be accomplished either by locating a larger number of warp-threads at the sides of the fabric than at other portions of the same, or by using stronger and heavier warp at these points. A tubular fabric in which one-half of the warp of the outer ply and one-half of the warp of the inner ply is laid nearly straight, and the remaining portion of the warp of the outer, inner, and intermediate ply or plies arranged so as to pass diagonally from one ply to another, may be woven on a circular loom, and thus produce a fabric similar to that of mine, and having some of its advantages.

A fabric of three or more plies may also be woven on a circular loom, and have a continuous length of weft or filling laid by one shuttle, by passing the latter between the warp of each ply in succession, and crossing over from one ply to the other, as heretofore described, where the fabric is woven on a flat loom.

Having fully described my invention, what I claim as new, and desire to secure by Letters Patent, is—

1. A tubular woven fabric consisting of three or more plies, having a portion of the warps of the inner and of the outer plies interwoven with the adjacent intermediate ply or plies, the remaining portions of the warp of the outer and of the inner plies passing nearly straight over and under the weft or filling of said plies, whereby the outer and inner surfaces are closely woven and a tubular fabric formed without seam or joint, substantially as set forth.

2. A tubular woven fabric composed of three or more plies, wherein the warp of the outer ply is of strong thick thread, and the warp of the inner ply of fine thread, one-half of the warp of the outer ply and one-half of the warp of the inner ply, together with a continuous weft, constituting the main portion of the outer and inner surfaces of the fabric, while the remaining portion of the warp of the outer and inner plies is laid diagonally and interwoven with the intermediate ply or plies by the continuous weft, which latter is laid helically, and extends through all the plies, substantially as set forth.

3. A tubular woven fabric composed of three or more plies, wherein a continuous weft or filling is laid successively through the several plies of the fabric, said weft passing from the outer to the inner ply in helical form, and then outwardly to the outer ply, thereby forming a continuous helical filling which extends the entire length of the fabric, substantially as set forth.

4. A tubular woven fabric made up of three or more plies, wherein one-half of the warp of the outer ply and one-half of the warp of the inner ply are laid alternately over and under the continuous weft, while the remaining portions of the warp of said plies are interwoven with the intermediate ply or plies by said weft, which latter is laid helically between the successive plies of the fabric, the entire warp and weft of said fabric being woven together, substantially as described, whereby the fabric in its normal condition is of oval or flattened form in cross-section, substantially as set forth.

SETH W. BAKER.

Witnesses:
JOSEPH A. MILLER,
JOSEPH A. MILLER, Jr.